March 25, 1941. F. H. RUTHERFORD 2,236,009
VALVE STRUCTURE
Original Filed Sept. 29, 1938
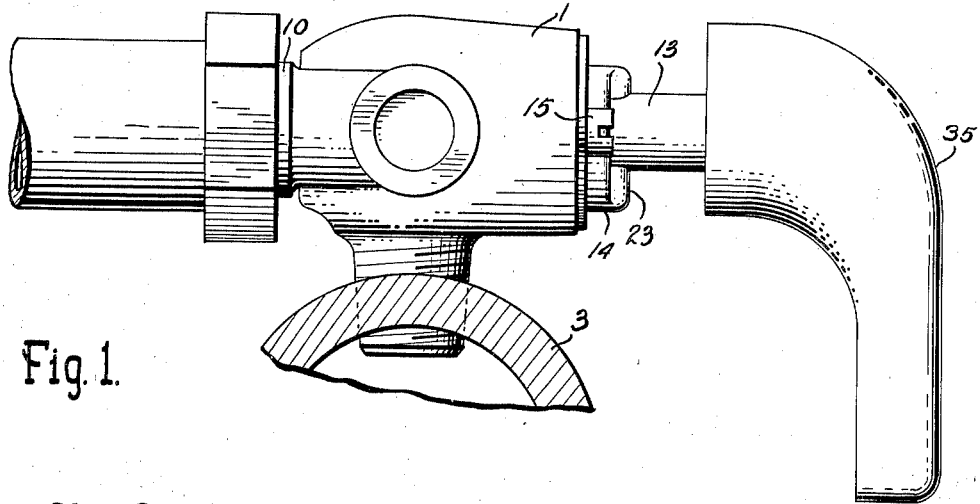
Fig. 1.
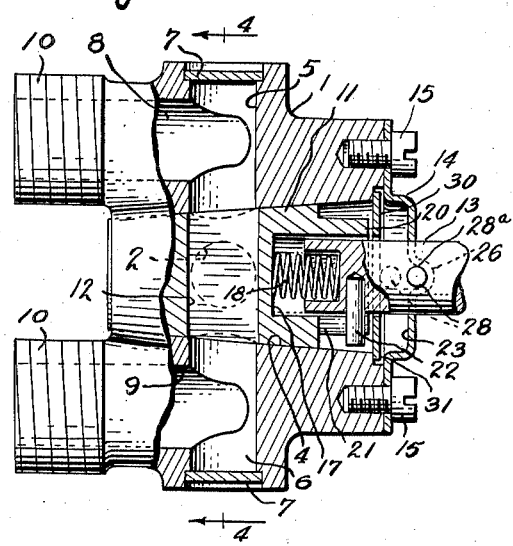
Fig. 2.
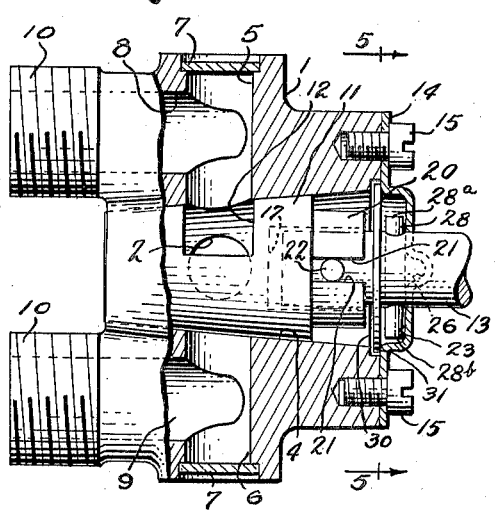
Fig. 3.
Fig. 4.
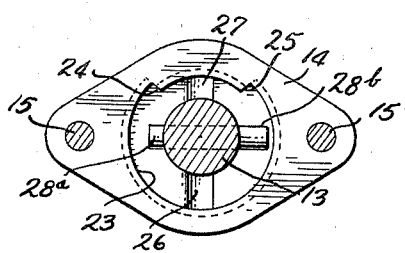
Fig. 5.
INVENTOR.
Francis H. Rutherford
BY
Barnes, Kisselle, Laughlin & Raisch
ATTORNEYS Patented Mar. 25, 1941

2,236,009

UNITED STATES PATENT OFFICE 2,236,009

VALVE STRUCTURE

Francis H. Rutherford, Detroit, Mich., assignor to Detroit Brass & Malleable Works, Detroit, Mich., a corporation of Michigan Original application September 29, 1938, Serial No. 232,402. Divided and this application March 22, 1939, Serial No. 263,476

1 Claim. (Cl. 251—165)

This invention relates to improvements in valve structures, and it is directed particularly to improvements in a valve structure useful as a gas cock.

The principal object of the invention is the provision of a novel arrangement in a valve which is of the locking type and in which the stem is shifted axially to release the lock for valve actuation. A simple structure embodying a minimum number of parts is provided; and although the stem functions to rotate the valve, the arrangement is such that when the stem is pushed axially toward the valve to release the lock the stem is prevented from being jammed against the valve, and thus where the valve is of the tapered type it is not forced in its tapered socket with undue pressure which would have a tendency to cause the valve to stick in its socket and be difficult to turn. This is a division of application Serial No. 232,402, filed September 29, 1938.

In the drawing:

Fig. 1 is a side elevational view of a valve showing a gas cock in which the invention is incorporated.

Fig. 2 is a horizontal sectional view taken through the valve.

Fig. 3 is a view similar to Fig. 2 showing the rotatable valve member showing the valve in partially open position.

Fig. 4 is a sectional view taken substantially on line 4—4 of Fig. 2.

Fig. 5 is a view taken substantially on line 5—5 of Fig. 3.

The valve body is illustrated at 1 and it has an extension arranged to be screw-threaded into a gas supply pipe or manifold 3 and which has a gas inlet passage 2. The body has a tapered valve chamber 4, and leading from the valve chamber are outlet passages 5 and 6 closed at their ends by plugs 7, these passages connecting into outlet passages 8 and 9 in threaded extensions 10. A tapered valve plug member 11 is seated in the chamber and it is provided with a slot 12.

A stem 13 is slidably and non-rotatably connected to the valve plug and has a handle 35 which is preferably detachably mounted on the stem. This stem extends through a cap 14 secured to the valve body by screws 15. The plug has an axial bore 17 into which the stem extends and a coil spring 18 situated in the bore and is disposed between the plug and stem, for which purpose the end of the stem may be recessed as indicated. The plug has an extension 20 slotted as at 21 for the reception of a projection or pin 22 on the stem for tying the stem and plug together for relative axial movement but for rotation in unison.

The cap may be a sheet metal stamping fashioned with a depression 23 terminating in shoulders 24 and 25. It is also formed with recesses 26 and 27. Opposite projections on the stem, which may be provided by a cross pin 28, lie under the cap as shown.

It will be observed that the spring 18 tends to hold the valve plug and stem away from each other. When the valve is "off" it is positioned as illustrated in Fig. 4, thus closing the gas inlet 2. At this time the cross pin 28 has its ends located in the recesses 26 and 27. The pin is so positioned that one end projects out more than the other so that the end 28a will pass the shoulders 24 and 25 and seat in the recess 27 while the ends 28b will strike the shoulders 24 and 25 and will seat in the recess 26. When the valve is "off," as shown in Fig. 4, the cross pin seats in the recesses 26 and 27 as shown in Fig. 2. In order to turn the valve "on," the stem is pushed inwardly substantially to the dotted line position illustrated in Fig. 2, and the stem may now be turned. If the valve is turned counterclockwise as Fig. 4 is viewed, the inlet 2 is opened and outlet 8 is brought into communication therewith, while the outlet 9 is closed. The dotted line illustration of Fig. 4 shows the valve in about a half "on" position which corresponds to the position shown in Figs. 3 and 5. When the valve is turned "off" the pin 28 rides along the cap until the valve reaches the position shown in Fig. 4, whereupon the spring 18 pushes the stem axially to seat the pin in the locking recesses in the cap. If, after pushing the stem inwardly to release the locking pin from the recesses, the valve is turned clockwise as Fig. 4 is viewed, the inlet 2 and outlet 9 are connected and the outlet 8 is closed.

Thus it will be seen that the valve is locked in "off" position but may be turned in either direction to connect the inlet in either outlet after first shifting the stem axially to release the locking structure.

It will be noted that the chamber and plug valve member are tapered and that the spring urges the plug onto its seat. If any pressure or force is exerted on the plug member to cause it to seat in the chamber with undue tightness, there is a tendency for the plug to stick and it will be hard to turn, especially if the valve is subjected to heat above normal room temperature. Therefore, the strength of the spring 18 has to be quite carefully selected. In an arrangement of this kind where the valve stem is pushed inwardly to release the lock, these forces may be transmitted to the plug member, and after continued operation in this manner the plug may be caused to stick to its seat or at least to turn very hard. To prevent this a stop is provided for limiting the inward movement of the stem. In the present structure this takes the form of a washer 30 surrounding the stem between the pin 22 and pin 28 and seating in a recess 31 in the valve body and underlying the cap. When the stem is pushed in to release the locking mechanism the cross pin 28 ultimately strikes the washer 30, thus definitely limiting the inward movement of the stem and preventing any of the forces being transmitted to the plug. The spring 18 is selected so that it is not collapsed completely when the washer limits this inward movement of the stem. By way of example it may be pointed out in one valve structure, that the spring exerted a seating pressure of about 4½ pounds when the valve was cold and when in locked position. When the stem is pushed in as far as it will go this pressure is increased only to about 5 pounds. Therefore, the seating pressure is fairly constant. The force of the operator's hand cannot be transmitted to the plug.

I claim:

A locking gas cock comprising, a valve body having a tapered valve chamber, a tapered valve plug rotatably seated in the chamber, passages in the plug and body arranged to be brought into and out of registry by rotation of the plug, an apertured stamped sheet metal cap secured to the body, an operating stem extending through the cap, means slidably and non-rotatably connecting the stem and the large end of the plug, a spring positioned between the plug and the stem tending to separate them axially, a loose washer positioned between the valve body and the cap and through which the stem extends, said cap being recessed to form a chamber between the recessed part of the cap and the washer, the bottom of the recess in the cap having radially extending locking depressions therein and a cross pin on the operating stem positioned in the chamber and adapted to seat in the depressions when the passages are out of registry to lock the valve in "off" position, said stem being shiftable toward the plug to remove the cross pin from the depression so that the plug may be turned on its seat, said spring holding the plug on its seat by the reactance of the cross pin on the cap in both "off" and "on" positions of the gas cock, said loose washer being engaged by the cross pin as the stem is pushed axially toward the plug against the action of said spring to limit said axial movement and prevent axial forces from binding the tapered plug in its seat.

FRANCIS H. RUTHERFORD.